United States Patent
Fitt

(10) Patent No.: US 12,222,919 B2
(45) Date of Patent: Feb. 11, 2025

(54) METHOD OF INDEXING A HIERARCHICAL DATA STRUCTURE

(71) Applicant: Siemens Industry Software Inc., Plano, TX (US)

(72) Inventor: Andrew Fitt, Cambridge (GB)

(73) Assignee: Siemens Industry Software Inc., Plano, TX (US)

( * ) Notice: Subject to any disclaimer, the term of this patent is extended or adjusted under 35 U.S.C. 154(b) by 22 days.

(21) Appl. No.: 18/008,406

(22) PCT Filed: Jun. 18, 2020

(86) PCT No.: PCT/US2020/038385
§ 371 (c)(1),
(2) Date: Dec. 5, 2022

(87) PCT Pub. No.: WO2021/257078
PCT Pub. Date: Dec. 23, 2021

(65) Prior Publication Data
US 2023/0205748 A1    Jun. 29, 2023

(51) Int. Cl.
*G06F 16/22*    (2019.01)
(52) U.S. Cl.
CPC ................................ *G06F 16/2272* (2019.01)
(58) Field of Classification Search
CPC ................................................... G06F 16/2272
USPC ........................................................ 707/743
See application file for complete search history.

(56) References Cited

U.S. PATENT DOCUMENTS

| | | | | |
|---|---|---|---|---|
| 9,461,876 | B2* | 10/2016 | Van Dusen | G06F 16/90335 |
| 11,029,806 | B1* | 6/2021 | Wijegunawardana | G06F 3/0482 |
| 11,157,517 | B2* | 10/2021 | Mandadi | G06F 16/1873 |
| 11,507,054 | B2* | 11/2022 | Behandish | G06F 30/23 |
| 2009/0171954 | A1 | 7/2009 | Liu | |
| 2010/0057407 | A1 | 3/2010 | Fitt | |
| 2010/0057729 | A1* | 3/2010 | Fitt | G06F 30/00 707/E17.001 |
| 2013/0132373 | A1 | 5/2013 | Huang et al. | |

(Continued)

FOREIGN PATENT DOCUMENTS

| | | |
|---|---|---|
| CN | 106202113 A | 12/2016 |
| CN | 111104377 A | 5/2020 |
| WO | 2010025312 A2 | 3/2010 |

*Primary Examiner* — Hosain T Alam
*Assistant Examiner* — Nicholas E Allen
(74) *Attorney, Agent, or Firm* — Lempia Summerfield Katz LLC

(57) ABSTRACT

A computer-implemented method of indexing a hierarchical data structure or product structure is disclosed. For a product structure including a product and a plurality of items associated with the product, each item shares a parent-child relationship with at least one other item or the product. The method includes generating a packed configuration-independent index of the product structure by enumerating an unconfigured item-path from the product to an item for each item. Then, when one or more unconfigured item-paths are identical, only one of the identical unconfigured item-paths is maintained. The index may also be combined with an unconfigured item-path spatial-bounds index. Both product structure and spatial location queries may be filtered against the combined index.

14 Claims, 4 Drawing Sheets

(56) References Cited

U.S. PATENT DOCUMENTS

| | | | |
|---|---|---|---|
| 2014/0075004 A1* | 3/2014 | Van Dusen | G07C 13/00 709/223 |
| 2014/0214753 A1* | 7/2014 | Guerra | G06F 16/254 707/602 |
| 2016/0063590 A1* | 3/2016 | Subramanya | G06Q 30/0623 705/26.61 |
| 2016/0314626 A1* | 10/2016 | Roetcisoender | G06F 16/2358 |
| 2017/0351226 A1* | 12/2017 | Bliss | G05B 19/4063 |
| 2020/0201292 A1* | 6/2020 | Cella | G05B 23/0259 |
| 2022/0108262 A1* | 4/2022 | Cella | G06Q 10/063118 |
| 2022/0253915 A1* | 8/2022 | Singhal | G06F 16/9538 |
| 2023/0334779 A1* | 10/2023 | Fitt | G06F 30/10 |

\* cited by examiner

| Product | Unconfigured Item-Path |
|---|---|
| Product 1 | /product 1/item 1 |
| Product 1 | /product 1/item 1/item 1.1 |
| Product 1 | /product 1/item 1/item 1.1/item 1.1.1 |
| Product 1 | /product 1/item 1/item 1.1/item 1.1.2 |
| Product 1 | /product /item 1/item 1.2 |
| Product 1 | /product /item 2 |

FIGURE 2

| Parent | Child | Transform |
|---|---|---|
| Product 1 | item 1 | tr 1 |
| Item 1 | item 1.1 | tr 1.1 |
| Item 1.1 | item 1.1.1 | tr 1.1.1 |
| Item 1.1 | item 1.1.2 | tr 1.1.2 |
| Item 1 | item 1.2 | tr 1.2 |
| Product 1 | item 2 | tr 2 |

FIGURE 3

| Item | Box |
|---|---|
| Item 1 | box 1 |
| Item 1.1 | box 1.1 |
| Item 1.2 | box 1.2 |
| Item 1.1.1 | box 1.1.1 |
| Item 1.1.2 | box 1.1.2 |

FIGURE 4

| Unconfigured Item-Path | Box |
|---|---|
| /product 1/item 1 | tr 1*box 1 |
| /product 1/item 1/item 1.1 | tr 1*tr 1.1*box 1.1 |
| /product 1/item 1/item 1.1/item 1.1.1 | tr 1*tr1.1*tr1.1.1*box 1.1.1 |
| /product 1/item 1/item 1.1/item 1.1.2 | tr 1*tr1.1*tr1.1.2*box 1.1.2 |
| /product 1/item 1/item 1.2 | tr 1*tr1.2*box 1.2 |
| /product 1/item 2 | tr 2*box 2 |

FIGURE 5

METHOD OF INDEXING A HIERARCHICAL DATA STRUCTURE

The present patent document is a § 371 nationalization of PCT Application Serial No. PCT/US2020/038385, filed Jun. 18, 2020, designating the United States, which is hereby incorporated by reference.

TECHNICAL FIELD

The present disclosure relates to a method of indexing hierarchical data structure, in particular a data structure that includes a data root and a plurality of values associated with the data root, wherein the values have a parent-child relationship with at least one other value or the data root.

BACKGROUND

Computer Aided Design (CAD) tools are used frequently in the manufacture of complex products. Such products may be represented within the software as a hierarchical product structure, e.g., displayed in the form of a product tree. This allows a user to interrogate the product structure in a simple manner to view or edit the components and component assemblies stored within the product structure. Over time, these components and components assemblies will undergo a number of revisions, which require configuring to produce a buildable product. For example, in automotive manufacture, a wheel requires several wheel bolts to be affixed to an axle, the wheel itself may be a front, rear, left, or right wheel, the axle will be mounted onto the chassis, the chassis linked to a vehicle model, and so on. This represents a fairly short product tree between the root (e.g., the vehicle) and the final item (e.g., a wheel bolt), but for a fully configured, buildable product, each wheel bolt requires its own branch in the product structure tree. The resulting configured product may be sizeable as each branch is configured whether it is displayed to a user or not.

In order to modify, manipulate, or make choices about the root product, in this case the vehicle, a user needs to be able to search for occurrences of components and component assemblies, individual components, or revisions of components within the product structure. Searching and configuring such a product structure may be slow, depending on the volume of data involved, and may be improved by using a cache of the configured product and its explosion into occurrences of components and component assemblies. However, a caching approach for such configured products has a number of disadvantages. Firstly, each individual configuration of the product requires a separate cache. Each cache needs to be stored and kept up-to-date. Secondly, change management processes lead to change-specific, user-specific, and group-specific configurations of a product. This increases the number of caches required. Lastly, historical configurations will also require a separate cache for each history point, no matter how few or many revisions are made. This increases the number of caches required yet further. Alternative approaches include techniques such as database indexing of paths through the product structure, which whilst an improvement on caching approaches, work well for short time periods. Longer time periods are likely to result in an explosion of paths due to revisions of components and component assemblies. This may be limited by indexing recent changes over a short timeframe, but this may not be practical or desirable for the user. There exists a need, therefore, to be able to index such hierarchical product structures in such a manner that searching for components and component assemblies and configuring products may be done without an explosion of data, regardless of the number of revisions carried out to the product or any of its components.

SUMMARY

The scope of the present disclosure is defined solely by the appended claims and is not affected to any degree by the statements within this summary. The present embodiments may obviate one or more of the drawbacks or limitations in the related art.

The present disclosure aims to address this problem by providing, in a first aspect, a computer-implemented method of indexing a hierarchical data structure including a data root and a plurality of values associated with the data root, wherein each value shares a parent-child relationship with at least one other value or the data root, the method including: generating a packed configuration-independent index of the data structure by enumerating an unconfigured value path from the data root to a value for each value; and when one or more unconfigured value paths are identical, maintaining only one of the identical unconfigured value paths.

Utilizing an unconfigured index removes the disadvantages of configured indexes, because rather than needing to configure and store every configuration of values in a data structure, only a single unconfigured value path is required. By removing the constraints associated with the configuration, the index also becomes flexible with regards to time, as individual value or data revisions do not need to be configured and stored. This therefore offers the abilities to interrogate a product structure without the need for extensive caching and process and view revisions over any timeframe.

The values may be in a spatial relationship with at least one of the data root and each other.

The method may further include, for each unconfigured value path:
determining a transform for each parent-child relationship in the unconfigured value path;
determining a spatial-bounding box for each item in the unconfigured value path using the value's geometric bounds; and permuting the transforms in the unconfigured value path with the spatial-bounding box of the last item in the unconfigured item-path to form an unconfigured value path spatial-bounds index.

The data structure may be a product structure, the data root may be a product, and a value may be an item in the product.

The present disclosure also provides, in another aspect, a computer-implemented method of indexing a hierarchical product structure including a product and a plurality of items associated with the product, wherein each item shares a parent-child relationship with at least one other item or the product. The method includes: generating a packed configuration-independent index of the product structure by enumerating an unconfigured item-path from the product to an item for each item; and when one or more unconfigured item-paths are identical, maintaining only one of the identical unconfigured item-paths.

The items may be in a spatial relationship with at least one of the product and each other.

The method may further include, for each unconfigured item-path: determining a transform for each parent-child relationship in the unconfigured item-path; determining a spatial-bounding box for each item in the unconfigured item-path using the item's geometric bounds; and permuting the transforms in the unconfigured item-path with the spatial-bounding box of the last item in the unconfigured item-path to form an unconfigured item-path spatial-bounds index.

An item of the plurality of items may be a component or an assembly of components.

The product may have a set of three orthogonal axes, and the spatial-bounding box may have axes aligned with the product axes.

Similar spatial-bounding boxes in an unconfigured item-path may be merged.

Indexing of the hierarchical product structure may be carried out in real-time and may include at least one revision of an item or the product.

In another aspect, a method of filtering queries in an index of a hierarchical product structure is provided. The method includes: accessing an index of a hierarchical product structure generated as above; filtering structure content queries against the configuration-independent product structure index to identify an item-path; filtering spatial location queries against the spatial-bounds index to identify a box path; and re-filtering the structure content query and/or the spatial location query against a configured product structure generated from box path.

In a third aspect, a non-transient computer program product including instructions is provided, wherein, when the program product is executed by a computer, the program product causes the computer to carry out the acts of the method.

BRIEF DESCRIPTION OF THE DRAWINGS

The disclosure is now described by way of example only, and with reference to the accompanying drawings, in which:

FIG. 2 is an example of an unconfigured product structure index for the product structure tree of FIG. 1 in accordance with embodiments of the present disclosure;

FIG. 3 is an example transform listing for an unconfigured product-bounds spatial index for the product structure tree of FIG. 1 in accordance with embodiments of the present disclosure;

FIG. 4 is an example spatial-bounds box listing for an unconfigured product-bounds spatial index for the product structure tree of FIG. 1 in accordance with embodiments of the present disclosure; and FIG. 5 is an example unconfigured product-bounds spatial index for the unconfigured product structure index of FIG. 2 in accordance with embodiments of the present disclosure.

DETAILED DESCRIPTION

Figure 1:
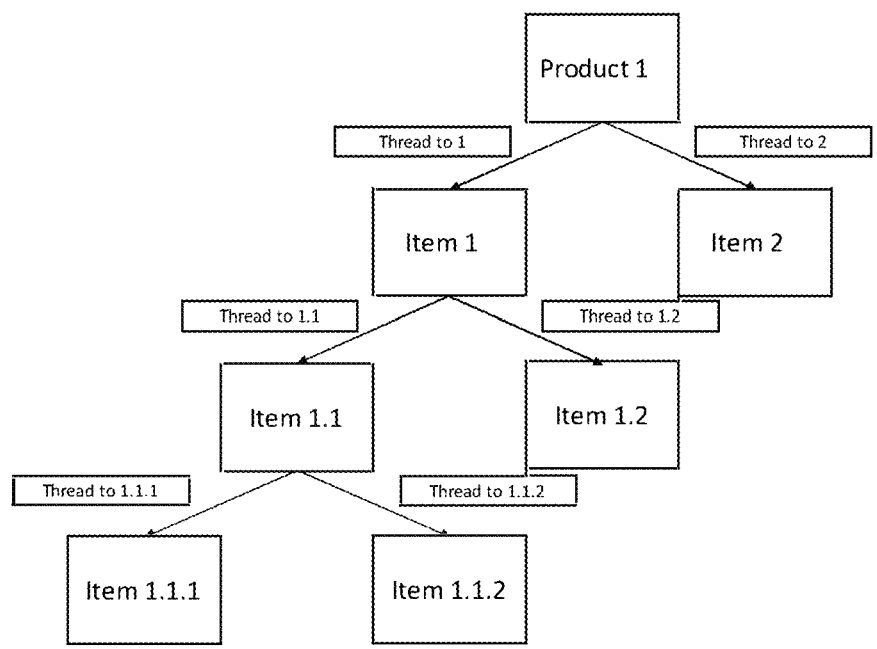
FIG. 1 is a schematic drawing illustrating an example portion of a product structure tree.

The present disclosure takes an alternative approach to indexing hierarchical structures to those in the prior art. A hierarchical structure includes several values sharing parent-child relationships, and may be expressed as a tree structure, with groups of parent-child relationships displayed as branches of the tree. Known caching and other methods involving configured products or tracing paths through configured product structures are avoided by employing the concept of an unconfigured product structure index. As the name implies, this does not require the storing of the configured product structure, nor does it rely on an index of configured product structures. A computer-implemented method is used to index a hierarchical data structure that includes a data root and a plurality of values associated with the data root. Each value shares a parent-child relationship with at least one other value or the data root. The data root may be, for example, a product structure or a process, and the values items making up the product (components or component assemblies) or process acts forming the process. The method initially includes generating a packed configuration-independent index of the data structure by enumerating an unconfigured value path from the data root to a value for each value. This enables the parent-child relationships between items or process acts to be determined and listed within the path. Once the unconfigured value paths are determined, if two or more of the unconfigured item-paths are identical, only one of the identical unconfigured value paths is maintained. This removes the likelihood of explosions of data as found in configured product indexes, because there is no proliferation of identical index paths possible.

A product structure will be used as the data structure in the following example in order to illustrate the present disclosure. If we consider a product that includes a large number of components and component assemblies, an item-path is a sequence of items representing possible Bill of Materials (BOM) lines within the product. In other words, the items (values) are associated with the product (root) and form a parent-child relationship with at least one other item or the product. The sequence within an individual product line is illustrated in FIG. 1.

FIG. 1 is a schematic drawing illustrating an example portion of a product structure tree. The product structure 100 begins with a product item identifier "product 1" and is followed by first level assembly identifiers "item 1," "item 2," linked to the product item identifier by the thread "thread to 1" and "thread to 2," respectively. This level is followed by second level assembly identifiers, which for the left-hand path of FIG. 1 only are "item 1.1" and "item 1.2," linked to "item 1" by the threads "thread to 1.1" and "thread to 1.2" respectively. Third level assembly identifiers "item 1.1.1," "item 1.1.2" follow and so on until the item representing the component or component assembly of interest is reached. Each item in the sequence is a possible child of the previous level, and a parent of a child in the successive level, thus the parent-child relationship may be used to represent leaf-level parts and assemblies in the same manner.

FIG. 2 is an example of an unconfigured product structure index for the product structure tree of FIG. 1 in accordance with embodiments of the present disclosure. Each unconfigured item-path has a sequence /item n/item n.$n_1$/item n.$n_1$.$n_2$ . . . where $n_1$ represents the first child item, $n_2$ the second child item and so on. This may be equally represented by considering a parent notation, where for child item $n_m$, the parent would be item $n_{m-1}$. FIG. 1 shows only a single possible unconfigured item-path for each item, although in reality components are found multiple times in both component assemblies and in products, such as in the wheel bolt example above. As a simple illustration, if all four wheels of a vehicle were identical, and each vehicle wheel required five wheel bolts, twenty configured item-paths would be required merely for a wheel bolt. It is easy to see how this would grow once the relationships between the wheel and the axle, the axle, and the chassis and so on are taken into account.

In contrast, in accordance with embodiments of the present disclosure, only one unconfigured item-path would be required, as the use of item identifiers allows multiple child item occurrences to be packed together, even across revisions. As each item is revised, no new item-paths are created. As items are re-positioned within a component assembly, or the quantity of an item is adjusted, again, there are no additional item-paths generated. The original product/item and parent/child relationships remain the same and no new parent/child relationships are created. However, this is not the case should a new item be added to an assembly or product. A new item will create new parent/child relationships therefore additional item-paths will be required for the item and any child items it may have. As a result, the configuration-independent product structure index needs to be updated. Conversely, should an item be removed from the product or assembly, then the number of item-paths may be reduced for this item and its child items, should it have any. These removed paths may be kept (and will be seen as false positives during searching) or may be removed from the index to provide that the size of the index is minimized.

The use of item-paths enabling the packing of multiple child item occurrences together is also beneficial when compared with the use of occurrence paths. Occurrence paths are similar in nature but link the occurrences of an item together. For example, the occurrence path for item 1.1.1 in FIG. 1 would be written as /thread to 1/thread to 1.1/thread to 1.1.1. Here the explosion of data in indexing over time is far more likely than with item-paths, where it may be shown that indexes exhibit much less growth over time for real-world data in comparison.

In addition, item-paths allow for the easy detection and handling of cycles. A cycle is where an item becomes its own parent or ancestor, and as such cannot exist in a configured product structure. Consequently, configured product structure indexes need to handle cycling, but when considering the item-path approach in accordance with embodiments of the present disclosure, any path that contains the same item twice or more represents a product structure cycle and may be omitted from the index.

In the above example, a product structure is used to illustrate the concept of the value path in a data structure in accordance with embodiments of the present disclosure. A value path index may be used to determined bounding answers to questions regarding the data structure. These include which values are found in a particular data root, where may the values be found in a data tree, which values are relevant for a particular data root, and which values are present in a particular data root. This means that the concept lends itself to use with processes as well as products. For example, a complex manufacturing instruction may include many processes, each of which relies on process acts, all of which may be represented in a tree structure. The same principle applies as with a product structure when considering which processes acts are repeated. Turning to the automotive example again, the process of putting a wheel including a tire onto an axle of a car includes placing the tire on the wheel and then mounting the wheel on the axle and securing it with five wheel bolts. Within an assembly process this would be done four times, meaning there would be twenty instructions to tighten a wheel bolt. Therefore, by producing an unconfigured step path for the step of tightening the wheel bolt, only one unconfigured step path would be required in a configuration-independent indexing approach.

Turning back to the product structure example of FIG. 1, although the unconfigured item-path index approach enables the bounding of answers to product structure questions, a user may require information on the positioning of items within the product structure. The concept of the configuration-independent index may be extended to contain spatial-bounds, which then enables the bounding of answers relating to the positioning of items within products and creates an unconfigured product spatial-bounds index.

Components and component assemblies within a product structure may have geometric bounds that relate to the co-ordinate frame of the product. Components themselves may be drawn in their own co-ordinate frame, for example, with the center of the component located at zero with aspects of the component extending along x-, y- and z-axes. This is possible for re-usable components, where the component is designed and then positioned within the product. The alternative approach is to use a design in-place process where the component is designed in the place it needs to fit, for example, on a car chassis. Design then position components will require a transform to transfer the component to the co-ordinate space of the product. For the unconfigured item-path structure, the geometric bounds for one item-path are formed by permuting the distinct transforms for each item-to-item-path hop with the distinct geometric bounds in the product co-ordinate frame for the last item in the path. An item-to-item path hop is the transition from parent item to child item. This is illustrated in FIG. 3 and described in more detail below. When there is more than one occurrence of an item in a configured assembly, the different occurrences may have different geometric positions. These will therefore correspond to different subsets of the unconfigured geometric bounds.

It is also common for item-path spatial-bounds to group into independent geometric positions. As an example, axis aligned three-dimensional boxes may be used to represent the spatial-bounds. This enables the formation of a set of axes aligned three-dimensional boxes in the product co-ordinate space for each item in the item-path, resulting in multiple boxes representing the item-path. Similar boxes within each item-path may be merged, as this will reduce the storage capacity required.

FIG. 3 is an example of an unconfigured product structure index for the product structure tree of FIG. 1 in accordance with embodiments of the present disclosure. The Parent column represents the parent in each parent child relationship, the Child column the child. The Transform column represents the transform required to carry out the item-to-item hop between the respective Parent and Child. For a parent n and child n−1, the transform will be in the form tr n−1. Therefore for the parent item 1.1 and child item 1.1.1, the item-to-item hop is determined by the transform tr 1.1.1.

FIG. 4 is an example spatial-bounding box listing for an unconfigured product-bounds spatial index for the product structure tree of FIG. 1 in accordance with embodiments of the present disclosure. Each spatial-bounding box is represented in the format box n for item n, such that the spatial-bounding box for item 1.1 is represented as box 1.1. Combining the transform listing and the spatial-bounding boxes for each item results in the creation of the configuration-independent spatial-bounds index. If an unconfigured item-path does not have a geometrical position, it is not possible to construct a spatial-bounding box.

FIG. 5 is an example unconfigured product-bounds spatial index for the unconfigured product structure index of FIG. 2 in accordance with embodiments of the present disclosure. For each unconfigured item-path shown in FIG. 2 a path box is created, containing the unconfigured item-path and the unconfigured spatial-bounds indexes for an item. These are of the format:

Item-path: /product 1/item $n_1$/item $n_2$/item $n_3$
and
Box: tr n*tr $n_1$*tr $n_2$*tr $n_3$*box $n_3$
For item 1.1.1 these are therefore notated as:
Item-path: /product 1/item 1/item 1.1/item 1.1.1, Box: tr 1*tr1.1*tr1.1.1*box 1.1.1

If a further occurrence of item 1.1.1 under item 1.1 is added, such as an additional bolt in a new wheel zone of the wheel, an additional index entry is created:

Item-path: /product 1/item 1/item 1.1/item 1.1.1, Box: tr 1*tr 1.1*tr 1.1.1a*box 1.1.1

When considering spatial-bounds although the spatial-bounding box for the item will be the same, it has been necessary to introduce a further transform, tr 1.1.1a, because the item to item-path hop is not replicated in the other item-paths. Whilst in the above example a box is used, other alternatives may be used depending on the product structure, such as bounding spheres or multiple bounding boxes.

Similar to the configuration-independent product structure index, an unconfigured item-path spatial index is suited to bounding the answers to product structure spatial location questions. These may include examples such as which occurrences of an item are in a spatial zone, which occurrences are near a given occurrence, or which occurrence cross a given section. Therefore, by using both the configuration-independent product structure index and the unconfigured item-path spatial bounds index together, a user is able to interrogate the product structure for both content and location information. When considering a data structure, it will be necessary to determine a transform for each parent-child relationship in the unconfigured value path. A spatial-bounding box for the last value in the unconfigured value path is then determined using the value's geometric bounds. Finally, the transforms in the unconfigured value path are permuted with the spatial-bounding box of the last item in the unconfigured item-path to form an unconfigured value path spatial-bounds index.

The advantages of the approach are readily apparent when a user wishes to work with a product structure indexed in accordance with embodiments of the present disclosure. Initially, a user is able to view a collapsed product structure tree that may be expanded to as many branches and levels as required to view individual items within that product structure. In order to find an item, a user may enter a search term into a dedicated search function for the product structure. Using the above automotive example, the user may wish to find a wheel bolt. Typing "wheel bolt" into the search function would cause the query to be filtered initially against the configuration-independent product structure and once found, the product structure tree would be expanded to show the wheel bolts within the product. Typing "wheel bolt left wheel zone" would require filtering of the query against the configuration-independent product structure index and the unconfigured item-path spatial-bounds index, causing the product tree to expand to show the wheel bolts in the left wheel zone. Further searching may then be carried out against this configured product structure.

Consequently, in order to use the index, the filtering of structure content queries against the configuration-independent product structure index takes place to identify an item-path. The filtering of spatial location queries against the spatial-bounds index is then also carried out to identify a box path. One proviso is that should an item not have a geometric location, there is no spatial bounding information to permute with the transforms therefore there is no spatial location query and no spatial bounds index entry for the item. Finally, the structure content query and/or the spatial location query is re-filtered against a configured product structure generated from box path. This then enables more detailed searching to take place as the product structure tree has been expanded at the correct point for the item in question. Various filtering techniques may be used to carry out such a filtering process. For example, Bounding Volume Hierarchy (BVH) methods lend themselves well to the process of filtering against an unconfigured item path index and/or an unconfigured item path spatial bounds index. A bounding volume hierarchy is a tree structure on a set of geometric objects, which are wrapped in bounding volumes that form the leaf nodes of the tree. These nodes are then grouped as small sets and enclosed within larger bounding volumes, which in turn are grouped and enclosed in larger bounding volumes and so on until a tree structure with a single bounding volume at the top of the tree is created. Axis-aligned bounding boxes, such as those described above for the geometric bounds of each item, may be classified as being part of a bounding volume hierarchy. Uses of Bounding Volume Hierarchies may include collision testing and ray tracing. Consequently, the methodology used to carry out operations on sets of geometric objects used with bounding volume hierarchies may be applied to the embodiments of the present disclosure. In particular, collision testing, where the intersection of two or more objects is detected is of use in embodiments of the present disclosure.

Similarly, with a process, as described above, there may be a spatial element that requires inclusion as well as the process acts. A user may need to know where a particular process will take place, for example, if a component needs to be moved between a workbench and a product.

Using the approach of the embodiments of the present disclosure also results in an index that supports a greater number of search scenarios than a configured product structure index. This reduces the index management load and results in an admin user needing to carry out less explicit index management. Further, a greater amount of pre-emptive index creation by index management tools is also enabled. Rapid filtering of parts of a product structure that a user is not interested also takes place, because there is no need to filter many occurrences of the same item.

A further benefit of embodiments of the present disclosure is the flexibility of the index with regard to dealing with revisions of items and product structures. There is no need to create additional unconfigured item-paths when an item is revised or moved in position over time, although of course the spatial-bounding may change. This time sensitivity and ability to track revisions is not found in configured product structure indexes. Therefore, such indexes lack the ability to deal with the time component unless excessive caching is employed, as the index is reconfigured each time a change is made. A configured index is therefore merely a snapshot of a configuration at one moment in time, whereas a configuration independent index is a real-time representation of the product structure. Indexing of the hierarchical product structure is therefore carried out in real-time and includes at least one revision of an item or the product. This flexibility with regard to revision also enables the same configuration independent index to be used by different users or at different locations as well as at different times, as there is no need to consider the effects this would have on the configuration of the product.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of indexing a hierarchical data structure comprising a data root and a plurality of values associated with the data root, wherein each value shares a parent-child relationship with at least one other value or the data root, the method comprising:
   generating a packed configuration-independent index of the hierarchical data structure by enumerating an unconfigured value path from the data root to a value for each value of the plurality of values;
   identifying one or more identical unconfigured value paths within a plurality of unconfigured value paths within the packed configuration-independent index;
   maintaining only one unconfigured value path of one or more unconfigured value paths for each identified identical unconfigured value path of the one or more identical unconfigured value paths to form an updated configuration-independent index; and
   storing or providing the updated configuration-independent index of the hierarchical data structure.

2. The method of claim 1, wherein the values are in a spatial relationship with at least one of the data root and each other.

3. The method of claim 2, further comprising, for each unconfigured value path of the one or more unconfigured value paths:
   determining a transform for each parent-child relationship in the unconfigured value path;
   determining a spatial-bounding box for a last item in the unconfigured value path using geometric bounds of the value; and
   permuting the transforms in the unconfigured value path with the spatial-bounding box of the last item in the unconfigured value path to form an unconfigured value path spatial-bounds index.

4. The method of claim 3, wherein the hierarchical data structure is a product structure,
   wherein the data root is a product, and
   wherein a value is an item.

5. A computer-implemented method of indexing a hierarchical product structure comprising a product and a plurality of items associated with the product, wherein each item of the plurality of items shares a parent-child relationship with at least one other item or the product, the method comprising:
   generating a packed configuration-independent index of the hierarchical product structure by enumerating an unconfigured item-path from the product to an item for each item of the plurality of items;
   identifying one or more identical unconfigured item-paths within packed configuration-independent index;
   maintaining only one unconfigured item-path of one or more unconfigured item-paths for each identified identical unconfigured item-path of the one or more identical unconfigured item-paths to form an updated configuration-independent index; and
   storing or providing the updated configuration-independent index of the hierarchical product structure.

6. The method of claim 5, wherein the items of the plurality of items are in a spatial relationship with at least one of the product and each other of the plurality of items.

7. The method of claim 6, further comprising, for each unconfigured item-path of the one or more unconfigured item-paths:
   determining a transform for each parent-child relationship in the unconfigured item-path;
   determining a spatial-bounding box for a last item in the unconfigured item-path using geometric bounds of the last item; and
   permuting the transforms in the unconfigured item-path with the spatial-bounding box of the last item in the unconfigured item-path to form an unconfigured item-path spatial-bounds index.

8. The method of claim 7, wherein an item of the plurality of items is a component or an assembly of components.

9. The method of claim 7, wherein the product has a set of three orthogonal axes, and
   wherein the spatial-bounding box has axes aligned with the three orthogonal axes of the product.

10. The method of claim 7, wherein similar spatial-bounding boxes in an unconfigured item-path of the one or more unconfigured item-paths are merged.

11. The method of claim 7, wherein the indexing of the hierarchical product structure is carried out in real-time and comprises at least one revision of an item or the product.

12. A computer-implemented method of filtering queries in an index of a hierarchical product structure, the method comprising:
   accessing the index of the hierarchical product structure, wherein the index of the hierarchical product structure has been generated by: (1) generating a packed configuration-independent index of the hierarchical product structure by enumerating an unconfigured item-path from a product to an item for each item of a plurality of items; (2) identifying one or more identical unconfigured item-paths within packed configuration-independent index; (3) maintaining only one unconfigured item-path of one or more unconfigured item-paths for each identified identical unconfigured item-path of the one or more identical unconfigured item-paths to form an updated configuration-independent index; and (4) storing or providing the updated configuration-independent index of the hierarchical product structure;
   filtering structure content queries against the packed configuration-independent index to identify an item-path;
   filtering spatial location queries against a spatial-bounds index to identify a box path; and
   re-filtering a structure content query of the structure content queries and/or a spatial location query of the spatial location queries against a configured product structure generated from box path.

13. The method of claim 1, wherein the hierarchical data structure is a product structure,
   wherein the data root is a product, and
   wherein a value is an item.

14. The method of claim 5, wherein the indexing of the hierarchical product structure is carried out in real-time and comprises at least one revision of an item or the product.

* * * * *